Patented Oct. 18, 1949

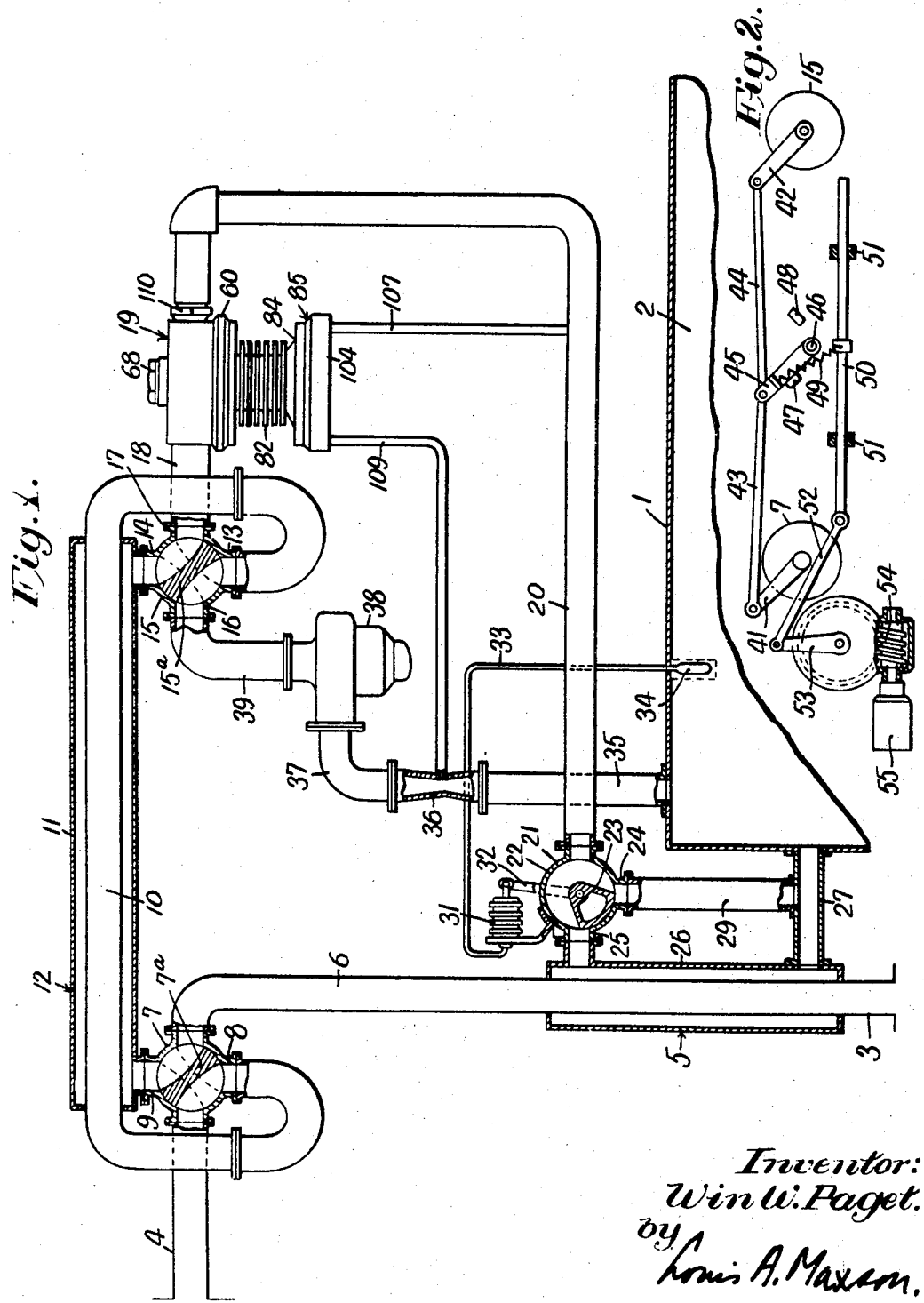

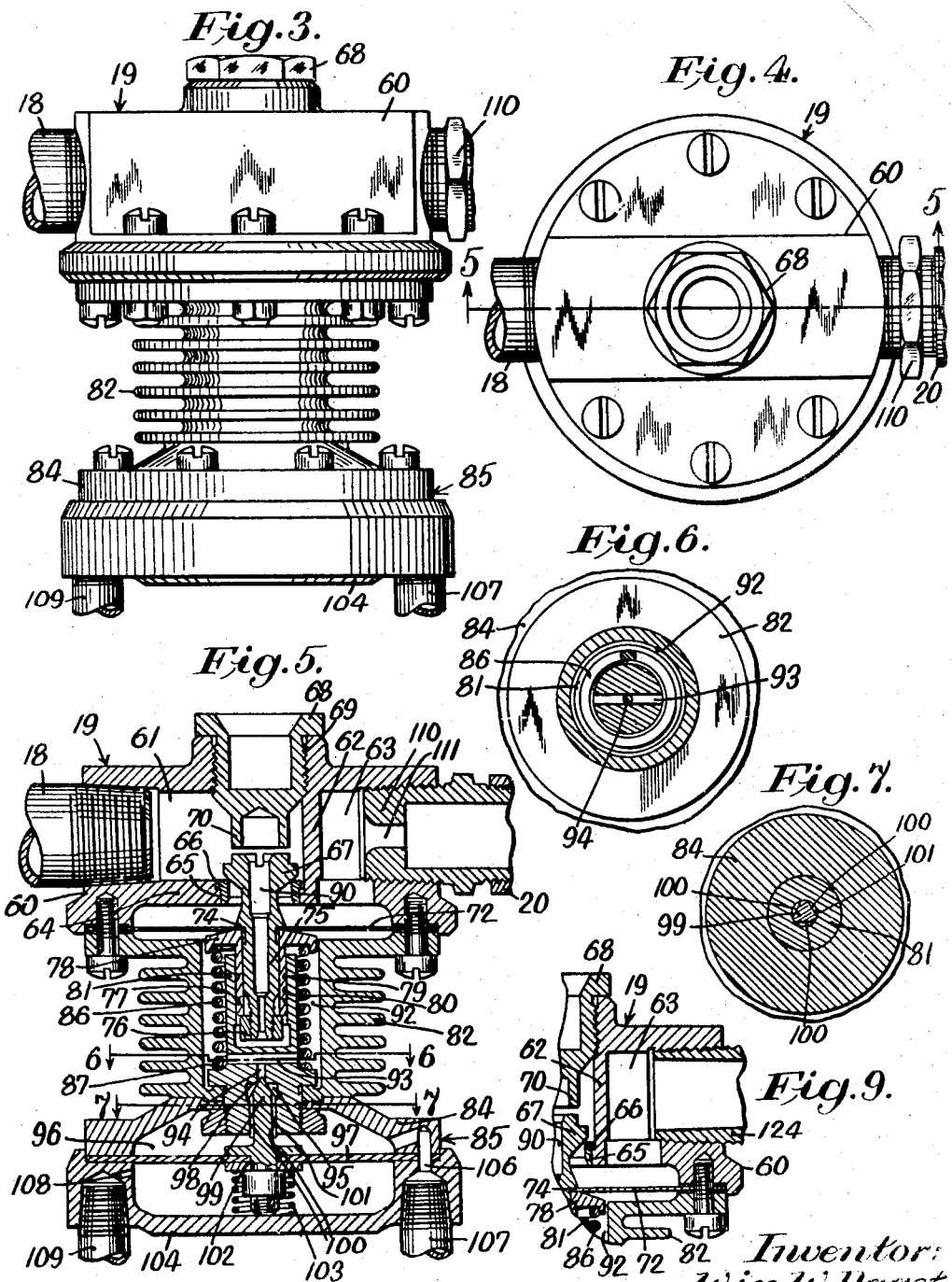

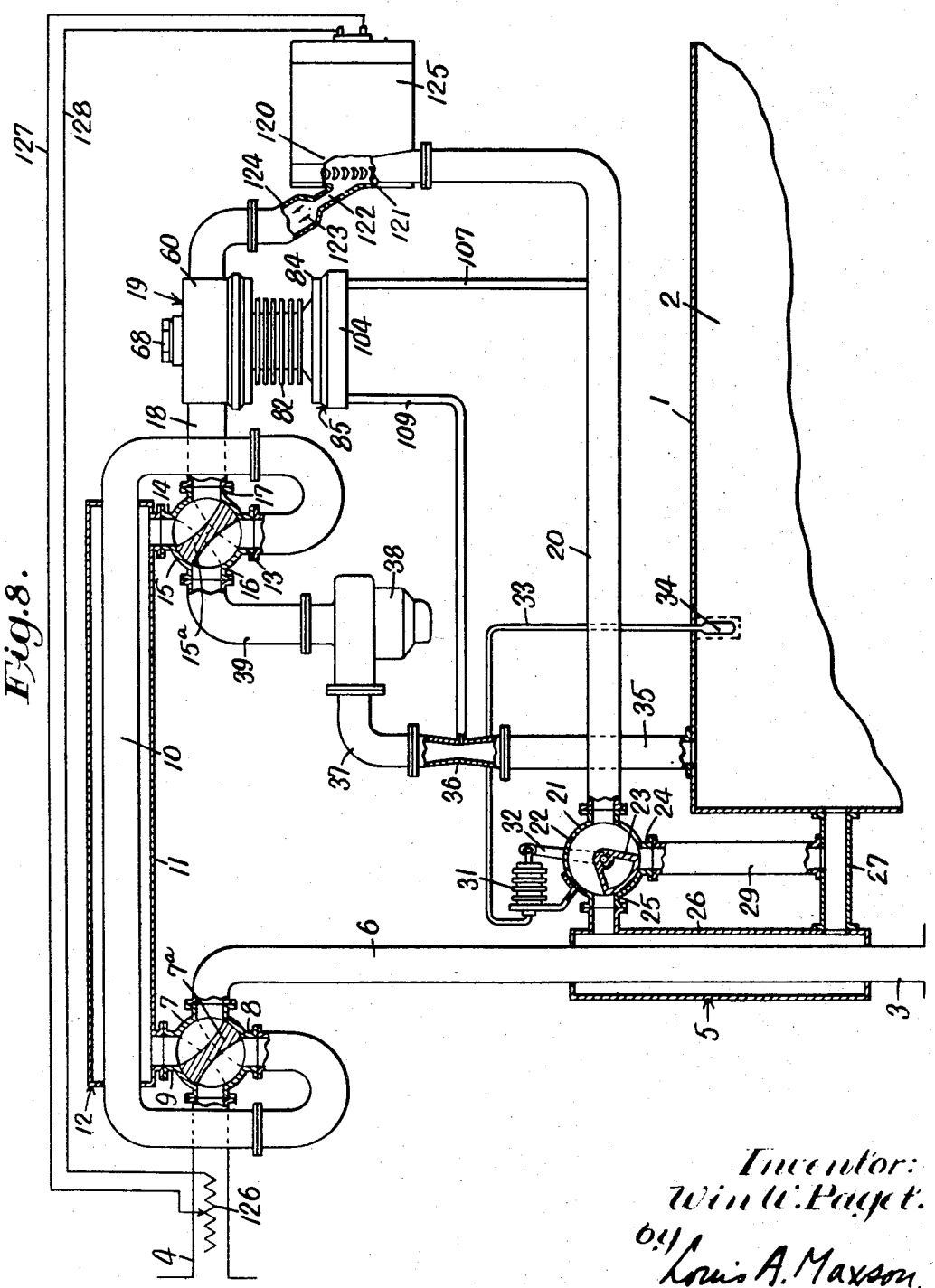

2,484,850

UNITED STATES PATENT OFFICE 2,484,850

MEANS FOR COOLING AND PRESSURIZING AIRCRAFT CABINS

Win W. Paget, Michigan City, Ind., assignor to Joy Manufacturing Company, a corporation of Pennsylvania Application September 14, 1944, Serial No. 554,020

26 Claims. (Cl. 62—136)

My invention relates to cabin pressurizing systems, and more particularly to systems for controlling the pressure, temperature and humidity in aircraft cabins; and further, particularly, with respect to some aspects, my invention relates to the field of war planes. From another aspect, my invention relates to methods of controlling one or more of the following: the temperature, pressure and humidity of the air, in aircraft cabins.

In the operation of airplanes at high altitudes, it is necessary to pressurize the cabins. This has been accomplished by the use of superchargers or cabin pressurizers, taking in air at the ambient pressures and forcing it into the cabin, and by maintaining the desired cabin pressure, which is different at different altitudes, by means of a cabin pressure vent or regulating valve automatically controlled to provide for the maintenance of the desired pressures within the cabin. Desirably, the cabin pressure is allowed to fall off as external pressure falls off with increasing height, for the first 8,000 to 10,000 feet above ground level. Thereafter, the cabin pressure may desirably be maintained substantially constant over a wide range of altitudes—up to 25,000, 30,000, or even 35,000 feet, depending upon the nature of the plane. After the top altitude for which the cabin pressure may desirably be maintained constant is reached, the pressure is, in aircraft flying at extreme altitudes, allowed to drop, either to maintain a constant pressure difference between the interior of the cabin and the outside thereof or to maintain a constant ratio between the internal and external pressures; or perhaps both types of controls may be used serially.

With respect to the temperature of the air in supercharged cabins, because of the wide range of external temperatures, and because flights are made in summer as well as in winter, sometimes the air entering the cabin will need cooling, and sometimes it will need heating, in order to maintain satisfactory cabin temperature conditions. Also in jet propelled aircraft cooling is necessary at times because the ramming of the air increases the temperature of the entering air very substantially. It is, moreover, desirable to control the humidity in the cabin, and to de-humidify the air entering the cabin.

Furthermore, it is desirable to provide arrangements whereby in the event that the cabin is perforated by "flak" or gunfire, or springs a leak for any cause, there may be an automatic increase in the volume of air supplied to the cabin.

So far as I am aware, the problem of pressurizing cabins of jet propelled aircraft has received inadequate consideration; and it is an object of my invention to provide not only an improved cabin pressurizing system, but also an improved cabin pressurizing system particularly adapted for use in jet propelled aircraft. It is another object of my invention to provide an improved cabin pressurizing system having improved means for controlling the humidity of the air in the cabin. It is still another object of my invention to provide an improved pressurizing system having improved means for taking air from a relatively high pressure source and metering it to the cabin in desired volume during normal flight conditions, and at an automatically increased volume in the event that the cabin is perforated in any manner. It is still another object of my invention to provide an improved cabin pressurizing system including improved means for always maintaining at least a minimum delivery of air to the cabin. Still another object of my invention is to provide an improved heat exchanger system for use with pressurized cabins in which there is automatically effected periodically an interchange between the courses of the heat exchanger and the fluids passing therethrough. It is still another object of my invention to provide an improved cabin pressurizing system, the pressurizing air for which is derived from a system of higher than cabin pressure air, and having improved means for automatically reducing the pressure to some value in excess of the cabin pressure and then metering the air at this reduced pressure through an orifice or a turbine to cool the same. It is still another object of my invention to provide an improved cabin pressurizing system embodying improved means for increasing the flow to the cabin by raising the pressure on an orifice or turbine by means of a mechanism responsive to a minimum flow to the cabin pressure regulating valve, whereby if the cabin be perforated, with the result that, with normal volume of air delivered thereto, but little air would be discharged through the cabin pressure regulating or vent valve, there will be an increased volume of air delivered automatically to the cabin. Still another object of my invention is to provide an improved cabin pressurizing system including improved means for cooling the cabin inlet air by the use of a turbine or other devices functioning by means of a pressure drop in the inlet air, with simultaneous taking of energy out of the same when an expansion engine or turbine is used, to effect cooling thereof.

It is also, from the method aspect of my invention, an object of the invention to provide an improved method of maintaining the requisite conditions in an aircraft cabin. It is another object to provide an improved method of maintaining an aircraft pressurized incorporating an improved method of humidity control. It is a further object of my invention to provide an improved method of furnishing air from an available relatively high pressure source to an aircraft cabin by a process including pressure reduction and metering of the air supply, with or without cooling by taking energy from the air, and ultimate governing of the pressure value in the cabin by air outflow regulating means. It is still another object of my invention to provide an improved method of pressurizing an aircraft cabin which includes the feature of automatically increasing the mass of air supplied under the control of a device responsive to reductions in the quantity of air discharged through the normal escape means. It is yet another object of the invention to provide an improved method of controlling the pressure conditions in aircraft cabins including the provision normally of a constant rate of (mass of) air supply with automatic increase in mass or rate in the event of cabin leakage.

Other objects and advantages of the invention will hereinafter more fully appear.

In the accompanying drawings, in which I have shown for purposes of illustration two illustrative embodiments of my improved cabin pressurizing system of this application, Fig. 1 is a generally diagrammatic view showing a preferred form of the system, parts being shown in elevation, and other parts in section.

Fig. 2 is a somewhat diagrammatic view of the device for automatically causing an interchange in the flow of fluids through a heat exchanger which is employed in my improved cabin pressurizing system.

Fig. 3 is a side elevation of an automatic controlling valve mechanism forming a part of my invention.

Fig. 4 is an end view of the valve mechanism of Fig. 3.

Fig. 5 is an axial section through the valve mechanism of Fig. 3 on the plane of the line 5—5 of Fig. 4.

Fig. 6 is a cross sectional view on the plane of the line 6—6 of Fig. 5.

Fig. 7 is a fragmentary sectional view on the plane of the line 7—7 of Fig. 5.

Fig. 8 is a generally diagrammatic view showing a modified form of the system of Fig. 1.

Fig. 9 is a fragmentary sectional view corresponding to a portion of Fig. 5 and showing a modified construction used in the system of Fig. 8.

While it will be understood that many of the features of my invention of this application may be utilized in other systems, I have shown the invention incorporated in a system for pressurizing the cabin of a jet propelled aircraft, with the pressurizing air derived from the jet engine induction system of the plane. As is well known to those having knowledge of this type of plane, the pressures in the jet engine induction system run quite high. This pressure pulsates at a rather high frequency—many cycles per second— with a substantial amplitude, and the pressure may change from high to low at an exceedingly rapid rate, and vice versa. These factors must be taken into consideration in utilizing the jet engine induction system as a source of pressurizing air. Another factor must also be taken into consideration, and that is that at sea level jet propelled aircraft fly so fast that the "ram" effect in taking in air into the aircraft by any means at all heats the air many degrees, with the result that some refrigeration is necessary.

Referring first to the system illustrated in Fig. 1, it will be noted that I have shown a cabin 1, the interior 2 of which is to be pressurized. This cabin is provided with pressurizing air from the jet engine induction system (not shown) of a jet propelled aircraft through a pipe or conduit 3; and the air discharged from the cabin ultimately leaves the aircraft through a pipe or conduit, a portion of which is shown at 4. The mechanism to be described, associated with the cabin, is, in the main, outside of the latter, but may be housed in the wing structure, or in any other suitable manner, so that it will not interfere with the efficiency of the aircraft in flight. The conduit 3 passes through a heat exchanger 5, which is diagrammatically shown; and the entering air, after passing through the heat exchanger 5, is conducted by a conduit 6 to a four-way valve 7, which has a valve element 7ª and to which, as shown, the conduit 4 is connected at a point diametrically opposite from the conduit 6. The other two mutually opposite connections from the four-way valve 7 are shown at 8 and 9 respectively, and these are connected to the courses or passes 10 and 11 respectively of a heat exchanger 12, which is diagrammatically shown, and as to whose construction more will be said at a later time. The opposite ends of the courses or passes 10 and 11 of the heat exchanger 12 are connected respectively at 13 and 14 to a second four-way valve 15, which includes a valve element 15ª. The other two mutually opposite connections of the four-way valve 15 are shown at 16 and 17. The connection 17 communicates with a conduit 18 leading to a valve mechanism, generally designated 19, and more fully described below. The delivery side of the valve mechanism 19 is connected through a conduit 20 with a three-way valve device 21, in whose casing 22 a valve 23 is oscillatably mounted. The valve member 23 is moved to determine the distribution of fluid entering the casing 22 through the conduit 20, to outlet connections 24 and 25. The connection 25 leads to the outside pass 26 of the heat exchanger 5, and the other end of the pass of this heat exchanger is connected by a conduit 27 to the interior of the cabin 2. The outlet connection 24 from the valve casing 22 is connected by a conduit 29 to the conduit 27; and it will be obvious that all the fluid passing through the conduit 20 and through the three-way valve 21 is delivered to the interior 2 of the cabin, portions of this air going through the heat exchanger 5 and portions through the direct connection 29, 27 under normal circumstances, but the valve 23 being positionable to confine all of the air flow to the connection 29, 27 or to passage through the heat exchanger 5. The position of the valve 23 is controlled by a thermostat bellows 31 operating on an arm 32 connected to the valve 23 and having its interior connected by a conduit 33 with a bulb 34 extending into the cabin space 2. The discharge line from the cabin space 2 is shown at 35; and a venturi 36 is arranged between the discharge line 35 and a connection 37 leading to the inlet side of a cabin pressure regulating valve 38, which may be of any suitable construction, such for example as is shown in my copending application, Ser. No. 468,938, filed December 14, 1942. The delivery or outlet side of the cabin pressure regulating valve 38 is connected by a conduit 39 to the connection 16 of the four-way valve 15. The valve mechanism 38 described and claimed in my application above mentioned permits cabin pressure to fall off substantially at the same rate with external pressure until the plane reaches some desired height such as 8,000 or 10,000 feet, and then operates to maintain cabin pressure substantially constant until some higher—much higher—altitude is reached, such as 30,000 or 35,000 feet, and then allows the cabin pressure to fall off to maintain a constant differential with respect to external pressure from 35,000 to 40,000 feet, and a constant ratio with respect to external pressure above that height. It is not necessary of course that a cabin pressure regulating valve operative to provide all of the functions mentioned be used, but the foregoing mode of operation is an acceptable one, and is illustrative of the possible modes of operation of these valves and is well adapted to military flight.

In order that the air entering the cabin may be properly de-humidified, it is desirable that provision be made for frequent reversals of the flow of the air through the heat exchanger 12, each pass of this heat exchanger being used, for a few minutes perhaps, for the delivery of the air coming in through the conduit 3 through the valve mechanism 19 and thence to the cabin, and then being subjected to a verse flow of the air leaving the cabin, so that any moisture condensed out in the heat exchanger will be discharged through the discharge line 4 to the exterior of the aircraft. Any suitable means may be provided for periodically automatically reversing the positions of the valve elements 7ª and 15ª of the valve mechanisms 7 and 15; and I have shown in Fig. 2 one arrangement adapted for this purpose. The valve element 7ª is provided with an operating lever 41, and the valve element 15ª is provided with an operating lever 42. These operating levers are connected respectively by links 43, 44 to the outer end of a snap action arm 45, which is pivoted at 46 in any suitable manner and which is adapted to be swung against stops 47 and 48. A spring 49, which effects the swinging of the arm 45, is connected to an operating rod 50 guided as at 51 in any suitable manner and connected by a link 52 to an arm 53 turned by a suitable reduction mechanism, herein shown simply as a worm reduction mechanism 54, driven by a motor 55. In actual practice, a more extensive reduction would be used, or the motor 55 would be replaced by a drive from a more slowly rotating shaft at some suitable place in the power plant. In any event, the mode of operation is such that the valves 7ª and 15ª will be caused to occupy the position shown in Fig. 1 for a predetermined time, say, for example 2 minutes, and then the lower end of the spring 49 having been moved to a position in which it lies to the right of the line connecting its point of attachment and the axis of the pivot 46, the arm 45 will be swung and will sharply reverse the position of the valves 7ª and 15ª, bringing them to the positions shown in dotted lines in Fig. 1. The heat exchanger 12 may be of any suitable high-efficiency type, as for example of the type in which fins or flanges helically disposed about the inner pass cause the fluid to be brought into intimate and prolonged contact with the heat exchanging surfaces. The heat exchanger 5 may be of similar construction, if desired.

The structure of the valve mechanism 19 may now be considered. The valve mechanism 19 is of the type which is adapted to reduce a higher pressure to a lower pressure and to hold the reduced pressure constant, regardless of normal variations in initial pressure or variation in flow, but is subject to an override which substantially modifies this action, as will be later explained. Basically, it comprises a casing 60 having an inlet chamber 61 separated by a septum 62 from a delivery chamber 63. The septum 62 has a wall 64 thereof provided with an opening 65 receiving a valve seat member 66 with which a valve 67 cooperates. A plug 68 adjustably mounted as at 69 provides a stop 70 for limiting the opening movement of the valve 67. The valve 67 is secured to a suitable diaphragm 72, herein illustrated as of stainless steel, this diaphragm forming the lower and a flexible wall for the discharge chamber 63. The valve 67 is fastened to the diaphragm by means of a shoulder 74, a reduced stem 75, a nut 76 threadedly secured to the reduced stem, and a sleeve 77 forced upwardly by the nut and having a head 78 engaging the lower side of the diaphragm. The sleeve 77 is grooved as at 79 to reduce leakage past it and is slidably received in the bore 80 of a cylindrically bored member 81. Mounted at the lower end of a hollow spacer member 82, which is used to clamp the diaphragm 72 against the casing 60, there is the upper half 84 of another diaphragm mechanism generally designated 85. A spring 86 extends between a shoulder 87 on the member 81 and the head 78, and normally tends to maintain the valve 67 open. The valve 67 is cross-slotted at its top and the stem of the valve 67 is bored as at 90, and air passing through this bore or through the slot and bore enters the bottom of the cylindrical bore 80 and leaks along the outside of the cylindrical member 77 into a chamber 92 in the spacer member 82. It will be understood that this is but a simple and preferred means, capable of substitution by other suitable arrangements, for effecting the supply of a limited volume of controlling fluid beneath the diaphragm 72. From chamber 92 this fluid is adapted to pass through a transverse bore 93 and through an axial bore 94 and then through a passage 95 in the lower end of the member 81 to a chamber 96 formed between the member 84 and a diaphragm 97. The bore 94 is surrounded by a valve seat 98, and a needle valve 99 having longitudinal grooves at 100 to permit fluid to pass along its length when it is unseated, is slidable in an enlarged bore 101 alined with the bore or passage 94. The valve 99 is suitably secured as at 102 to the diaphragm 97, and a spring 103 acting against the lower casing member 104 of the bellows device 85 normally tends to maintain the valve 99 seated. A connection 106 from the space above the diaphragm 97 is connected by a conduit 107 with the conduit 20 so that fluid leaking into the chamber 96 may be led away to the interior of the cabin. A port 108 opening into the space below the diaphragm 97 is connected by a conduit 109 with the throat of the venturi 36. It will be understood that when the flow through the venturi 36 falls below a predetermined minimum there will be, beneath the diaphragm 97, the building up of the pressure to such a relation with the pressure above the diaphragm that the valve 99 may be partially or wholly seated, with the result that fluid no longer can escape freely, or sometimes at all, from the space 92, and accordingly the pressure beneath the diaphragm 72 will build up and force the valve 67 off of its seat a greater distance than would result were the pressure beneath the bellows 72 simply that in the conduit 20.

In the system shown in Fig. 1, there is provided a reducing nozzle 110 having an orifice 111 formed therethrough, and this reducing nozzle is adapted to cause expansion of the air in the chamber 63 down to a pressure, at most, of a very few pounds gauge per square inch, a pressure which is suitable for supply to the cabin. The size of the orifice will be chosen to permit, at the normal pressure which prevails in chamber 63, the delivery of the desired quantity of air to the cabin when the valve 99 is unseated.

Before describing further the mode of operation of the valve mechanism, it may be well to describe the differences of the system shown in Fig. 8 from that which has just been explained. The differences consist in two things. For the purpose of obtaining a more substantial reduction in temperature of the air on its way to the cabin I have shown in Fig. 8, instead of the orifice 111, an expansion device of the character which takes work out of the air, herein an expansion turbine driving a generator. This turbine 120 may be of any suitable type and includes a rotor 121 to which air is delivered through a nozzle 122, and the quantity of fluid flowing through the nozzle may be determined either by the design of the nozzle or by the provision of adjustable shutters or other suitable arrangements, as at 123, in the conduit 124 leading from the discharge chamber 63 of the valve device 19. In any event, whether through the shutters 123 or through the design of the nozzle, a quantity (weight) of air of the desired amount will be metered to the turbine and thence to the cabin. In order to take work out of the air the rotor 121 is caused to drive a generator 125, and to dissipate the energy produced by the generator any suitable system may be used, and I have shown a simple system consisting of a resistance 126 located in the discharge line 4 and connected by conductors 127 and 128 with the generator 125. Desirably this resistance may be a variable one, controlled by the generator governor, not shown, as the details of such arrangements are well known to those skilled in the electrical arts. With this arrangement the expansion turbine etc. will operate substantially to cool the relatively warm air coming from the engine induction system, the temperature of which air may be markedly increased due to the ramming action referred to above, and thereby there may be prevented the building up of cabin temperature above a desired limit. The warm entering air coming into the system described through the connection 3 will be able to reheat as necessary the cooled air passing through the conduit 20, but were it not for this cooling, or cooling otherwise provided, as in the first form of my invention, excessive cabin temperatures might be encountered.

The mode of operation of the valve mechanism 19 and of the orifice which is associated with it in the preferred form of the invention may now be readily understood. The pressure reducing valve mechanism 19, being of the character and construction described, may operate to reduce the pressure coming from the jet engine induction system, which is both relatively high and subject to wide fluctuations, to a steady flow at a pressure on the order of 20 pounds per square inch gauge. This pressure will be effective, by reason of the proper selection of the size of the orifice 111, to cause the delivery of a substantially constant volume of air to the cabin so long as the pressure in the cabin is less than about four pounds gauge per square inch, a pressure which it will not be allowed to reach by reason of the operation of the cabin pressure regulating valve 38. Thus, during normal operation there will be a continuous delivery of a predetermined amount in pounds of air per minute to the cabin through the orifice 111. If the cabin pressure falls by reason of leakage however caused, this will result, with a constant weight of air per unit of time passing to the cabin, in a reduction in the quantity of air which will pass through the venturi 36 on its way to the cabin vent valve, and when the volume of air passing through the venturi reaches a predetermined minimum, the pressure in the chamber below the diaphragm 97 in Fig. 5 will build up, with a resultant closing movement of the valve 99 and the putting into effect of the override, and an increased opening of the valve 67 over that which would subsist in the normal operation of the device 19. This means that a higher pressure will attain to the chamber 63, and of course an increase in pressure in the chamber 63 will cause a larger weight of air to flow through the orifice 111. For example, to show the mode of operation of this valve mechanism more fully, when the gauge pressure in the chamber 61 is about three times that ordinarily subsisting in the chamber 63, the override may permit the delivery of about 75% more air through the orifice 111, while when the gauge pressure in the chamber 61 is in the neighborhood of five times that in the chamber 63 the override may permit perhaps about 200% increase in the weight of air delivered through the orifice 111; and when the gauge pressure in the chamber 61 bears a still higher ratio to that of air in the chamber 63, even larger weights of air will be transmitted through the orifice. In other words, the override operates on a principle such that the amount of extra air taken from the engine induction system can be larger when the pressure is higher. It will of course be understood that the increases in the mass of air delivered will vary with the pressure normally automatically maintained in the chamber 63 when there is no abnormal escape of air from the cabin. If the pressure in the chamber 63 was normally about 42 pounds guage instead of 20 pounds, as above assumed, the mass of air delivered under the assumed supply side pressures of the valve device 19 would be reduced when override took place. Normally, speaking in terms of absolute pressures, it is desirable to hold a pressure on the orifice which is preferably at least 1.88 times the maximum cabin pressure, for, as is well known, when the pressure at the supply side of an orifice is at least 1.88 times the maximum pressure at the other side of the orifice the same volume of fluid will flow through the orifice, with constant pressure at the supply side, regardless of the possibility that the pressure at the supply side may be 1.88 times the maximum pressure at the other side of the orifice, 3.0 times that pressure, or any other value in excess of 1.88 times the outlet side pressure. However, when this is impracticable it marks a departure from but one preferential feature of my invention, and not from the invention as a whole.

While there are in this application specifically described two forms which the invention may assume in practice, in its apparatus aspect, and one application of its method aspect, it will be understood that these forms and method are disclosed for purposes of illustration and that the invention may be modified and embodied in various other forms and procedures without departing from its spirit or the scope of the appended claims.

What I claim as new and desire to secure by Letters Patent is:

1. The method of maintaining an aircraft cabin pressurized including withdrawing air from a relatively high pressure source, reducing the pressure thereof to some value in excess of the cabin pressure, metering the air which has been so reduced in pressure through an orifice, supplying the air so metered to the cabin, and controlling the pressure within the cabin by regulating the discharge of air therefrom.

2. The method of maintaining an aircraft cabin pressurized including withdrawing air from a relatively high pressure source, reducing the pressure thereof to some relatively constant value in excess of the cabin pressure, metering the air to cause the passage of a substantially constant mass thereof towards the cabin, passing the air through an expansion engine, and controlling the pressure within the cabin by regulating the discharge of air therefrom.

3. The method of maintaining an aircraft cabin pressurized including withdrawing air from a relatively high pressure source, reducing the pressure thereof to some relatively constant value in excess of the cabin pressure, metering the air to cause the passage of a substantially constant mass thereof towards the cabin, passing the air through an expansion turbine, and controlling the pressure within the cabin by regulating the discharge of air therefrom.

4. The method of maintaining pressurized an aircraft cabin which has a cabin pressure regulating valve governing the rate of fluid escape, said method including normally supplying air to the cabin at a predetermined uniform rate, and increasing the rate automatically under the control of the mass flow of the air which passes through said cabin pressure regulating valve when the mass of air passing through the cabin pressure regulating valve in a unit of time falls below a predetermined amount.

5. The method of maintaining pressurized an aircraft cabin which has a cabin pressure regulating valve governing the rate of fluid escape, said method including normally supplying air to the cabin at a predetermined rate by metering the entire supply through an orifice, and increasing the rate automatically, under the control of the mass flow of the air which passes through said cabin pressure regulating valve, by increasing the pressure at the input side of the orifice when the mass of air passing through the cabin pressure regulating valve falls below a predetermined amount.

6. The method of de-humidifying air for an aircraft cabin which includes the steps of passing the air entering the cabin and the air leaving the cabin in streams through different passes of a heat exchanger, in alternation, in heat exchange relation with each other.

7. The method of treating the air supplied to an aircraft cabin including the steps of passing it through an expansion device for reducing the temperature thereof and then passing variable portions thereof into the cabin directly or through a heating device, varying said portions in accordance with cabin temperature variations.

8. The method of providing pressurizing air for an aircraft cabin that includes compressing air received from outside the cabin, reducing the pressure of the air which is to enter the cabin to a pressure which is normally substantially constant at a value at least 1.88 times the maximum cabin pressure, and admitting the air to the cabin through an orifice with a further reduction in the pressure thereof.

9. A pressurizing system for an aircraft cabin comprising, in combination, passage means for connecting the cabin in communication with a source of air under pressure, a pressure reducing valve connected in said passage means and through which air under pressure passes on its way to the cabin and operating normally to effect a flow of air to the cabin at a predetermined rate, means for venting the cabin, and means responsive to the flow of the air which passes through said venting means for controlling said reducing valve.

10. A pressurizing system for an aircraft cabin comprising, in combination, passage means for connecting the cabin in communication with a source of air under pressure, a pressure reducing valve connected in said passage means and through which air under pressure passes on its way to the cabin and operating normally to effect a flow of air to the cabin at a predetermined rate, means for venting the cabin, and means responsive to the flow of the air which passes through said venting means and operating on a reduced flow through said venting means for overriding said reducing valve so as to effect an increased flow of air to the cabin.

11. A pressurizing system for an aircraft cabin comprising, in combination, passage means for connecting the cabin in communication with a source of air under pressure, a pressure reducing valve connected in said passage means and through which air under pressure passes on its way to the cabin and operating normally to effect a flow of air to the cabin at a predetermined rate, means for venting the cabin, said venting means including valve means operating to regulate the flow of air from the cabin so as to maintain predetermined pressures therein, and means responsive to the flow of the air going to said valve means for controlling said reducing valve.

12. A pressurizing system for an aircraft cabin comprising, in combination, passage means for connecting the cabin in communication with a source of air under pressure, a pressure reducing valve connected in said passage means and through which air under pressure passes on its way to the cabin and operating normally to effect a flow of air to the cabin at a predetermined rate, means for venting the cabin, said venting means including valve means operating to regulate the flow of air from the cabin so as to maintain predetermined pressures therein, and means responsive to the flow of the air going to said valve means and operating on a reduced flow therethrough for overriding said reducing valve so as to effect an increased flow of air to the cabin.

13. A pressurizing system for an aircraft cabin comprising, in combination, passage means for connecting the cabin in communication with a source of air under pressure, a pressure reducing valve connected in said passage means, passage means for venting the cabin to the surrounding atmosphere, a venturi connected in said last mentioned passage means, pressure responsive means for controlling said pressure reducing valve, said pressure responsive means having oppositely directed pressure areas, passage means for connecting one of said pressure areas to the throat of said venturi, and passage means for connecting another of said areas to said first mentioned passage means at the discharge side of said pressure reducing valve.

14. A pressurizing system for an aircraft cabin comprising, in combination, passage means for connecting the cabin in communication with a source of air under pressure, a pressure reducing valve connected in said passage means, means including a pressure regulating valve for venting the cabin to the surrounding atmosphere, a venturi connected at the cabin side of said pressure regulating valve, and pressure responsive means for controlling said pressure reducing valve having passage means connecting the same to the throat of said venturi.

15. In a cabin pressurizing system, in combination, a source of pressurizing air under varying pressure, a reducing valve of the constant-delivery-pressure type through which air is delivered from said source, an orifice device for providing a constant mass flow through which orifice device the air passing through said reducing valve flows on the way to an aircraft cabin, and conduit means connecting said orifice device with the interior of a cabin.

16. In a cabin pressurizing system, in combination, a source of pressurizing air under varying pressure, a reducing valve of the constant-delivery-pressure type through which air is delivered from said source, an expansion engine through which the air passing through said reducing valve flows on the way to an aircraft cabin, and conduit means connecting said expansion engine with the interior of a cabin.

17. In a cabin pressurizing system, a conduit supplied with air at substantial pressure and at a temperature rendering cooling preliminary to cabin pressurizing use desirable, a heat exchanger having a course through which such air is adapted to flow and a second course through which more or less of such air is adapted to later to pass on its way to a cabin, air pressure reducing and cooling means between the first and second courses of said heat exchanger in the path of air flow to such cabin, a by-pass passage for short circuiting said second course, and cabin temperature controlled means for variably dividing the flow of air between said by-pass and said second course.

18. In a cabin pressurizing system, a conduit supplied with air at substantial pressure and at a temperature rendering cooling preliminary to cabin pressurizing use desirable, a heat exchanger having a course through which such air is adapted to flow and a second course through which more or less of such air is adapted later to pass on its way to a cabin, air-dehumidifying and air pressure reducing and cooling means between the first and second courses of said heat exchanger in the path of air flow to such cabin, a by-pass passage for short circuiting said second course, and cabin temperature controlled means for variably dividing the flow of air between said by-pass and said second course.

19. In a cabin pressurizing system, a cabin having an air supply opening, a source of air under substantial pressure such as to require reduction before cabin-pressurizing use, a heat exchanger having alternate courses, a valve controlled vent passage from said cabin, an outlet from said cabin, and means for connecting said source with the cabin supply opening alternately through said courses and concurrently connecting said valve controlled vent passage with said outlet alternately through the courses which are not acting as a supply passage, said connecting means having controlling means for effecting automatic reversals of flow periodically.

20. For use in a cabin pressurizing system, a controlling apparatus including a variable inlet pressure, constant discharge pressure pressure reducing valve set to maintain a discharge pressure at least 1.88 times the desired maximum cabin pressure, and an orifice device for metering the air passing through said pressure-reducing valve connected to the discharge of the latter.

21. For use in a cabin pressurizing system, a controlling apparatus including a variable inlet pressure, constant discharge pressure pressure reducing valve set to maintain a discharge pressure at least 1.88 times the desired maximum cabin pressure, an orifice device for metering the air passing through said pressure-reducing valve connected to the discharge of the latter, and an overriding control associated with said pressure-reducing valve for increasing the rate of flow past said valve automatically upon a sudden pressure drop at the discharge side of said orifice device.

22. In a cabin pressurizing system, a cabin, means for supplying air to the cabin, a cabin pressure regulating vent valve, a venturi connecting said vent valve with the interior of the cabin and through which the air leaving the cabin past said vent valve flows, means for automatically regulating the pressure, and thereby the rate, of cabin pressurizing air supply to the cabin, and means governed by flow through said venturi for automatically effecting a variation in the delivery pressure of said pressure-regulating means.

23. In a cabin pressurizing system, in combination, a cabin, means for supplying air to said cabin, means for venting air from said cabin including a cabin pressure regulating vent valve, means including a valve member for controlling the flow of air through said air supply means to said cabin, a pressure responsive element for positioning said valve member, said pressure responsive element having oppositely directed pressure areas, means for connecting one of said areas in free communication with said air supply means at one side of said valve member, means for connecting the opposite one of said areas in restricted communication with said air supply means at the other side of said valve member, passage means for venting air from said opposite one of said areas, valve means for controlling the flow of air through said passage means, and means responsive to the flow of air through said cabin venting means for controlling said valve means.

24. The method of maintaining pressurized an aircraft cabin which has a cabin pressure regulating valve governing the rate of fluid escape, said method including normally supplying air to the cabin at a predetermined uniform rate, and increasing the rate automatically, under the control of the mass flow of the air which passes through cabin pressure regulating valve, when the mass of air passing through the cabin pressure regulating valve falls below a predetermined amount.

25. The method of maintaining pressurized an aircraft cabin which has a cabin pressure regulating valve governing the rate of fluid escape, said method including normally supplying air to the cabin at a predetermined rate by metering the supply through an orifice, and increasing the rate automatically, under the control of the mass flow of the air which passes through the cabin pressure regulating valve, by increasing the pressure at the input side of the orifice when the mass of air passing through the cabin pressure regulating valve falls below a predetermined amount.

26. A pressurizing system for an aircraft cabin comprising, in combination, passage means for connecting the cabin in communication with a source of air under pressure, a pressure reducing valve connected in said passage means, means including a pressure regulating valve for venting the cabin to the surrounding atmosphere, a venturi connected at the cabin side of said pressure regulating valve, pressure responsive means for controlling said pressure reducing valve, and passage means respectively connecting said pressure responsive means to the throat of said venturi and to the cabin side of said pressure reducing valve at a point ahead of said venturi.

WIN W. PAGET.

REFERENCES CITED

The following references are of record in the file of this patent:

UNITED STATES PATENTS

| Number | Name | Date |
|---|---|---|
| 2,191,289 | Price | Feb. 20, 1940 |
| 2,284,984 | Nixon et al. | June 2, 1942 |
| 2,289,639 | Fausek | July 14, 1942 |
| 2,313,149 | Jacobsson | Mar. 9, 1943 |
| 2,316,237 | Grunert et al. | Apr. 13, 1943 |
| 2,316,416 | Gregg | Apr. 13, 1943 |
| 2,328,489 | Pfau | Aug. 31, 1943 |
| 2,391,838 | Kleinhans et al. | Dec. 25, 1945 |
| 2,405,670 | Price | Aug. 13, 1946 |
| 2,414,202 | Jepson et al. | Jan. 14, 1947 |

Certificate of Correction

Patent No. 2,484,850                                                    October 18, 1949

WIN W. PAGET

It is hereby certified that error appears in the printed specification of the above numbered patent requiring correction as follows:

Column 1, line 4, for "ii" read *in*; column 5, line 33, for the word "verse" read *reverse*; column 11, line 44, after "adapted" strike out "to"; column 12, line 66, before "cabin" insert *the*;

and that the said Letters Patent should be read as corrected above, so that the same may conform to the record of the case in the Patent Office.

Signed and sealed this 21st day of November, A. D. 1950.

[SEAL]

THOMAS F. MURPHY,
*Assistant Commissioner of Patents.*